April 29, 1930.  H. J. H. HUBER ET AL  1,756,865
HIGH POTENTIAL SWITCHING STATION
Filed June 21, 1926  2 Sheets-Sheet 1
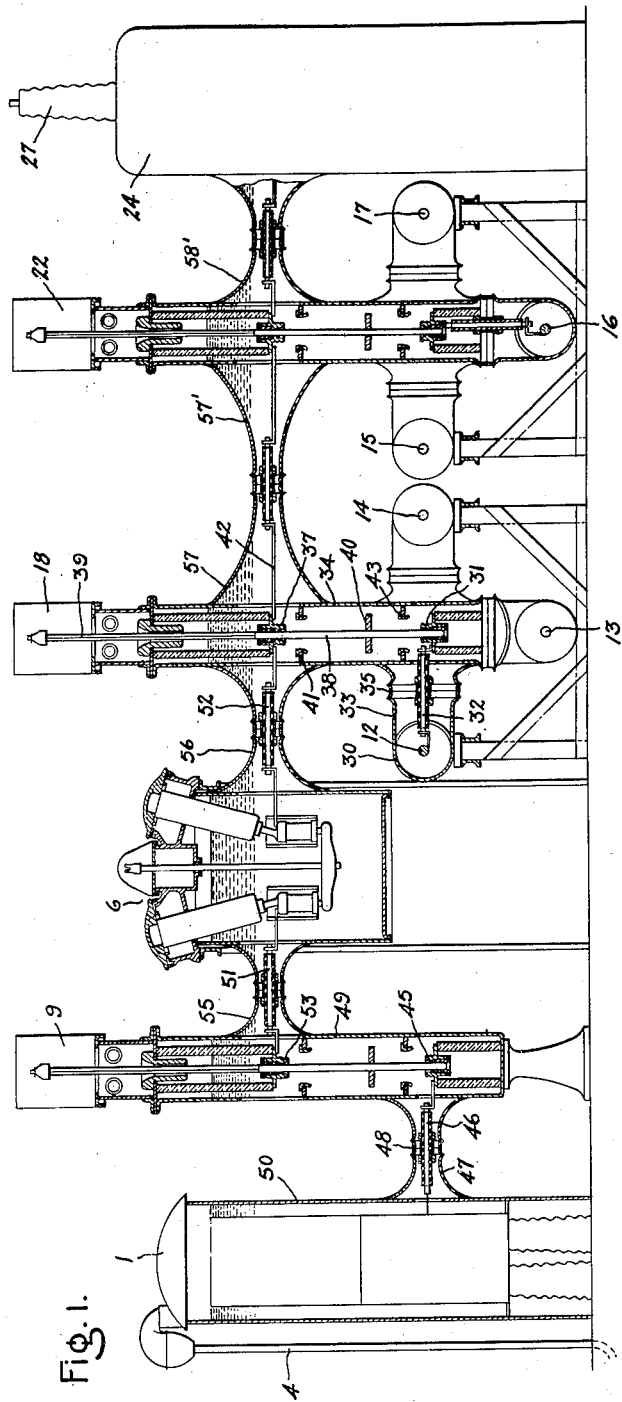
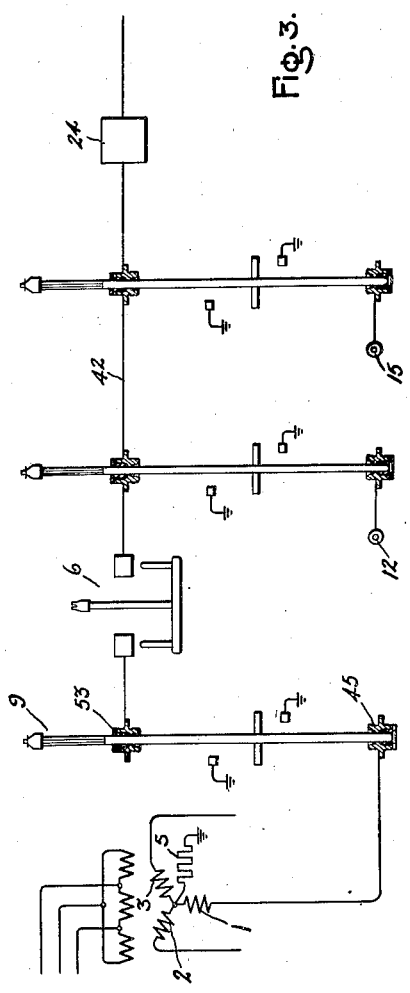
Inventor:
Herman J. H. Huber,
Henry Trencham;
by Alexander S. [signature]
His Attorney.

April 29, 1930. H. J. H. HUBER ET AL 1,756,865
HIGH POTENTIAL SWITCHING STATION
Filed June 21, 1926 2 Sheets-Sheet 2
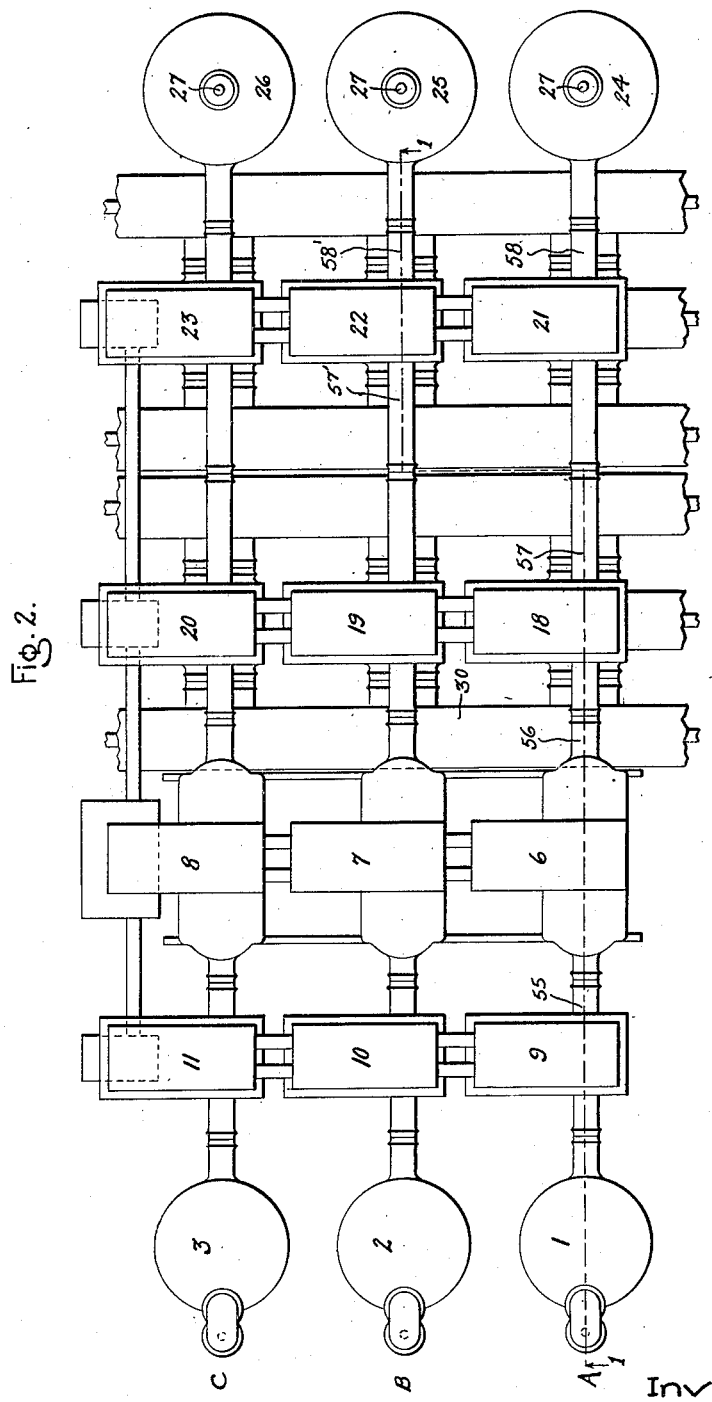
Inventor:
Herman J. H. Huber,
Henry Trencham;
by
His Attorney.

Patented Apr. 29, 1930

1,756,865

UNITED STATES PATENT OFFICE

HERMAN J. H. HUBER, OF UPPER DARBY, PENNSYLVANIA, AND HENRY TRENCHAM, OF RUISLIP, ENGLAND, ASSIGNORS TO GENERAL ELECTRIC COMPANY, A CORPORATION OF NEW YORK

HIGH-POTENTIAL SWITCHING STATION

Application filed June 21, 1926. Serial No. 117,319.

Our invention relates to an improved switching equipment for electric power stations and an object of our invention is to provide an arrangement which has moderate space requirements, which provides a high factor of safety to the operating force, which eliminates as nearly as practicable the possibility of short circuits between phases and in which a fault on any phase of the system can develop only into a single phase short circuit.

Short circuit currents in the switching equipment of modern large power systems involve tremendous amounts of energy and are destructive to equipment and dangerous to life. In our invention we utilize principles of construction which make it impossible for a fault on the system to develop into an interphase short circuit without first appearing as a short circuit to ground. The magnitude of the latter can be limited by means which have long been well known in the art, for example a three phase source of current may have its neutral grounded through a current limiting means such as a resistor in which case any fault to ground merely produces a single phase short circuit of limited power. Means may also be provided for opening switches to isolate the defective parts of the equipment upon the occurrence of such a fault to ground, but we shall not illustrate any such means, as it forms no part of our present invention.

Our invention will be better understood from the following description taken in connection with the accompanying drawing, and its scope will be pointed out in the appended claims.

Referring to the drawing, Fig. 1 is an elevation partly in section on line 1—1 of Fig. 2 of certain apparatus comprising a three-phase high potential station embodying my invention; Fig. 2 is a top plan view of the same; and Fig. 3 is a circuit diagram.

In the drawing, we have shown three single phase oil-immersed potential transformers 1, 2 and 3, one for each phase, each having a lead 4 which is adapted to connect with a suitable source, not shown. The transformers have their secondaries Y-connected with the neutral point grounded through the resistance 5. While we have shown transformers 1, 2 and 3, these may be omitted and the generator leads connected directly with the switching apparatus. For opening and closing the three phase circuit connected with the secondaries of the transformers 1, 2 and 3 are three oil circuit breakers 6, 7 and 8, there being one for each phase and in each phase between the transformer and the oil switch thereof is one of three oil-immersed disconnecting switches 9, 10 and 11. Three main buses 12, 13 and 14, and three auxiliary buses 15, 16 and 17 are shown extending in a direction at right angles to line of apparatus above described and by means of two sets of oil-immersed disconnecting switches 18, 19 and 20, and 21, 22 and 23, the generator may be connected with either the main buses or the auxiliary buses. Beyond the disconnecting switches 21, 22 and 23 we have shown the three lightning arresters 24, 25 and 26 from the terminals 27 on the top of which the three phase conductors of the line may be connected. Where connections are to be made with cables, cable terminals obviously may be substituted for lightning arresters. The transformers, disconnecting and oil switches, above described, are those associated with a single generating unit and in the case of a large station will be duplicated as many fold as there are generating units, the apparatus for each successive unit being arranged similarly to that described and adapted to be connected with the same main and auxiliary buses.

Each phase bus is enclosed in a separate metal sheath or pipe 30, suitable insulators being provided for supporting the bus centrally of the pipe and the space between the bus and the wall of the pipe is filled with an insulating oil. The connection between each phase bus and the corresponding disconnecting switch is carried through a branch pipe which joins the pipe enclosing the phase bus with the casing of the disconnecting switch. For example, the main phase bus 12 is connected with the lower fixed contact 31 of disconnecting switch 18 by the connector 32 which is enclosed by the branch pipe 33 connecting the pipe 30 with the casing 34 of the disconnecting switch. In this branch pipe 33 is shown a flexible connection 35. The connector 32 is suitably insulated where it passes into the switch casing and into the bus pipe and is also surrounded by oil since the phase bus pipe 30, the branch pipe 33 and the switch casing 34 all communicate with each other. The disconnecting switch 18 has an upper fixed contact 37 through which the movable contact rod 38 extends. The upper portion 39 of this rod is preferably of insulating material and extends up through the top of the switch casing to suitable actuating mechanism, not shown. The bus phase pipes, the branch pipes and the switch casing are all grounded either by separate ground connections or by a single ground connection, inasmuch as they are all in metallic connection with each other. For the purpose of affording greater security we have provided the disconnecting switches with means whereby the circuit on either side may be grounded at will if so desired. Referring to disconnecting switch 18 by way of example, the contact rod 38 has a cross arm 40 thereon and projecting from the casing 34 in line with the ends of this arm are the two sets of grounding contacts 41 and 43. In the normal connecting and disconnecting positions of the contact rod 38, the arm 40 does not engage either set of grounding contacts. If, after the contact rod 38 has been raised to open circuit position, it is desired to ground phase conductor 42, the rod is raised further to bring the arm 40 into contact with the grounding contacts 41. If, on the other hand, it is desired to ground the bus 12, the contact rod is lowered from the position shown, which operation first opens the circuit at the contact 37 and by a further movement brings the arm 40 in contact with the grounding contacts 43. Disconnecting switches 19 and 20 are each similar to the switch 18 except that switch 19 will control connection between phase bus 13 and the phase conductor 42 of phase B and switch 20 will control connection between phase bus 14 and the phase conductor 42 of phase C.

The three disconnecting switches 21, 22 and 23 are similar in all respects to switches 18, 19, and 20, it being noted that Fig. 1 shows switch 22 in section where connection is made between auxiliary bus 16 and phase conductor 42 of the B phase.

Disconnecting switches 9, 10 and 11 are all similar to switch 18 above described. To the lower fixed contact 45 of this switch, a connector 46 extends to the secondary of the transformer 1, the connector being enclosed by a metallic pipe 47 having a flexible connection 48 therein and being joined to the switch casing 49 and to the transformer casing 50. The oil switch 6 has its terminals connected respectively by the connectors 51 and 52 with the upper fixed contact 53 of disconnecting switch 9 and with the upper fixed contact 37 of switch 18. Each of these connectors, as well as those joining the disconnecting switches 18 and 22 and lightning arrester with the adjacent switch are enclosed respectively by metallic pipes 55, 56, 57 and 58 similar to the pipe 47. These pipes are in electrical connection with the casings which they join to form an oil-filled unit, it being noted that the oil in the several casings stands at the same level. The casings and the connecting pipes and the bus enclosing pipes of the metal-clad switchgear are all grounded, and since each phase is completely enclosed by a grounded sheath, the only fault that can occur is a fault to ground. In the event of such, however, the short circuit current will be limited by the resistance 5 connecting the transformer neutral with ground.

What we claim as new and desire to secure by Letters Patent of the United States is:

1. In a polyphase switching station comprising a source having a grounded neutral and current limiting means therein, a metal-clad unit comprising a set of bus bars each individually and centrally mounted in a separate grounded metallic pipe, a phase connection to each bus bar, separate main and disconnecting switches for controlling each of said phase connections, each switch having a separate enclosing grounded casing and each phase connection having separate metallic enclosures connecting the switch casings and the bus bar enclosure of the corresponding phase, an insulating oil contained in said casings and enclosures, and flexible connections in the enclosures for the phase connections, said enclosures and flexible connections being constructed to form oil-tight intercommunicating passages for the insulating oil.

2. Metal-clad switchgear for a polyphase system comprising a plurality of bus bars, each individually mounted within a separate grounded metallic pipe containing an insulating oil, phase connections for the respective bus bars, a main switch and disconnecting switches in each phase connection, separate grounded metallic oil-containing enclosures for each of the main and disconnecting switches, metallic oil-containing means for enclosing the connections between the main switch and disconnecting switches, and metallic oil-containing enclosing means for the connections between the bus bars and disconnecting switches, said oil-containing means intercommunicating with said metallic enclosures to form an oil-filled unit for each phase.

3. Metal-clad switchgear for a polyphase system comprising a plurality of bus bars, each individually mounted within a separate grounded metallic pipe containing oil for insulating the bus bar therefrom, phase connections for the respective bus bars, a main switch and disconnecting switches for controlling each phase connection, grounded metallic oil-containing enclosures for each of the main and disconnecting switches, metallic oil-containing means for enclosing the connections between the main switch, disconnecting switches and bus bars respectively, said oil-containing enclosures and means intercommunicating and rigidly and permanently mounted with respect to each other to form an oil-filled unit for each phase.

4. Metal-clad switchgear for a polyphase system comprising a plurality of bus bars, each bus bar individually mounted within a grounded metallic pipe containing an insulating oil, phase connections for the respective bus bars, a main switch and disconnecting switches for controlling each phase connection, grounded metallic oil-containing enclosures for each of the main and disconnecting switches, metallic oil-containing means for enclosing the connections between the main switch, disconnecting switches and bus bars respectively and connected with said enclosures to form an oil-filled unit for each phase and grounding connections immersed in the oil of each of said disconnecting switches whereby the disconnecting switch in its main switch isolating position is adapted to ground the phase connection at either side of said disconnecting switch.

In witness whereof, HERMAN J. H. HUBER has hereunto set his hand this 7th day of May, 1926, and HENRY TRENCHAM has hereunto set his hand this 28th day of May, 1926.

HERMAN J. H. HUBER.
HENRY TRENCHAM.